(12) United States Patent
Fukushima et al.

(10) Patent No.: US 12,444,546 B2
(45) Date of Patent: Oct. 14, 2025

(54) ELECTROLYTIC CAPACITOR AND METHOD FOR PRODUCING ELECTROLYTIC CAPACITOR

(71) Applicant: Nippon Chemi-Con Corporation, Tokyo (JP)

(72) Inventors: Kouta Fukushima, Fukushima (JP); Keisuke Tanabe, Fukushima (JP)

(73) Assignee: Nippon Chemi-Con Corporation, Tokyo (JP)

( * ) Notice: Subject to any disclaimer, the term of this patent is extended or adjusted under 35 U.S.C. 154(b) by 287 days.

(21) Appl. No.: 18/020,417

(22) PCT Filed: Aug. 24, 2021

(86) PCT No.: PCT/JP2021/030968
§ 371 (c)(1),
(2) Date: Feb. 8, 2023

(87) PCT Pub. No.: WO2022/045122
PCT Pub. Date: Mar. 3, 2022

(65) Prior Publication Data
US 2024/0038451 A1  Feb. 1, 2024

(30) Foreign Application Priority Data
Aug. 28, 2020 (JP) ................. 2020-144770

(51) Int. Cl.
*H01G 9/042* (2006.01)
*H01G 9/00* (2006.01)
*H01G 9/012* (2006.01)

(52) U.S. Cl.
CPC ......... *H01G 9/0425* (2013.01); *H01G 9/0029* (2013.01); *H01G 9/012* (2013.01)

(58) Field of Classification Search
CPC ..... H01G 9/012; H01G 9/0029; H01G 9/0425
See application file for complete search history.

(56) References Cited

U.S. PATENT DOCUMENTS 7,006,348 B1 * 2/2006 Ueda ............... H01G 9/045
29/25.03
2006/0061940 A1  3/2006 Ueda et al.
(Continued)

FOREIGN PATENT DOCUMENTS

JP   H04-061109 A      2/1992
JP   2004079838 A  *   3/2004
(Continued)

OTHER PUBLICATIONS

Office Action issued Sep. 25, 2024, in Chinese Patent Application No. 202180061243.4.
(Continued)

*Primary Examiner* — David M Sinclair
(74) *Attorney, Agent, or Firm* — Potomac Law Group, PLLC

(57) ABSTRACT

An electrolytic capacitor with improved connectivity between a cathode body including a carbon layer and a lead terminal, and a production method thereof are provided. The electrolytic capacitor 1 includes an anode body 2 having a dielectric oxide film 5 on a surface thereof, a cathode body 3 having a cathode foil 31 and a carbon layer 32 formed on the cathode foil 31, electrolytic solution 6 interposed between the anode body 2 and the cathode body 3, and a lead terminal 7 connected to each of the anode body 2 and the cathode body 3 by cold pressure welding. A maximum static friction coefficient of a surface of the carbon layer of the cathode body is 0.6 or more.

12 Claims, 7 Drawing Sheets

(56) References Cited

U.S. PATENT DOCUMENTS

2012/0214049 A1* 8/2012 Iwamoto ............... H01G 9/008
                                                        361/535
2018/0047521 A1    2/2018 Tsuda

FOREIGN PATENT DOCUMENTS

| | | | |
|---|---|---|---|
| JP | 2005223197 A | * | 8/2005 |
| JP | 2006080111 A | * | 3/2006 |
| JP | 2009290059 A | * | 12/2009 |
| JP | 2012-069829 A | | 4/2012 |
| WO | WO 2016/174807 A1 | | 11/2016 |
| WO | WO 2020/059609 A1 | | 3/2020 |

OTHER PUBLICATIONS

Office Action issued Nov. 5, 2024, in Taiwanese Patent Application No. 110131373.
International Search Report from International Patent Application No. PCT/JP2021/030968, Oct. 26, 2021.
Extended European Search Report and European Search Opinion issued Feb. 21, 2025, in European Patent Application No. 21861547.4.
Office Action issued May 31, 2025, in Chinese Patent Application No. 202180061243.4.

* cited by examiner

ELECTROLYTIC CAPACITOR AND METHOD FOR PRODUCING ELECTROLYTIC CAPACITOR

FIELD OF INVENTION

The present disclosure relates to an electrolytic capacitor and a production method thereof.

BACKGROUND

An electrolytic capacitor includes valve action metal, such as tantalum or aluminum, as an anode foil and a cathode foil. A surface of the anode foil is enlarged by making the valve action metal into a sintered body or a shape such as an etching foil, and the enlarged surface has dielectric oxide film layer. Electrolytic solution is interposed between the anode foil and the cathode foil. The electrolytic solution closely contacts with the uneven surface of the anode foil and acts as a true cathode. This electrolytic solution obtains anode-side capacitance by the dielectric polarization action of the dielectric oxide film layer.

The electrolytic capacitor can be regarded as a series capacitor in which capacitance is obtained at the anode side and the cathode side. Therefore, cathode-side capacitance is very important to efficiently utilize the anode-side capacitance. Surface area of the cathode foil is also increased by an etching process, however there is a limit to surface enlargement of the cathode foil from the viewpoint of thickness of the cathode foil.

Accordingly, an electrolytic capacitor in which film of a metal nitride, such as titanium nitride, is formed on the cathode foil has been proposed (see Patent Document 1). Under nitrogen gas environment, titanium is evaporated by a vacuum arc deposition, which is a type of an ion plating method, and deposits titanium nitride on the surface of the cathode foil. The metal nitrides are inert, and it is difficult for natural oxide film to form on the metal nitrides. Furthermore, fine unevenness us formed on the deposited film such that the surface area of the cathode is enlarged. However, the deposition process for the metal nitrides is complicated and increases the cost of the electrolytic capacitor.

Accordingly, the inventors considered forming a carbon layer on the cathode foil. The carbon layer is positioned on the outermost surface of the cathode body. The cathode-side capacitance of this electrolytic capacitor is expressed by a power storage action of an electric double layer formed on a boundary surface between a polar electrode and an electrolyte.

PRIOR ART DOCUMENT

Patent Document

Patent Document 1: JP H04-61109 A

SUMMARY OF INVENTION

Problems to be Solved by Invention

A lead terminal is drawn out from the electrolytic capacitor, and the electrolytic capacitor is electrically connected to a circuit via this lead terminal. For example, the lead terminal has a tab-shape including a flat portion formed of aluminum. The plain portion is connected to each of the anode body and the cathode body of the electrolytic capacitor in various connection method, and the lead terminal is drawn out from the electrolytic capacitor body.

Cold pressure welding is known as the connection method for the lead terminal, the anode, and the cathode. In the cold pressure welding, the anode body, the cathode body, and the flat portion of the lead terminal are laminated and are pressurized in the lamination direction under non-heating condition. It is said that this causes atomic boding between each of the anode body and the cathode body, and the flat portion of the lead terminal.

It was found that, when the cathode body forming the carbon layer on the cathode foil is connected to the lead terminal by the cold pressure welding, connectivity thereof was worse than in a case in which the cathode body without the carbon layer is connected to the lead terminal by the cold pressure welding. That is, it was found that physical connection strength between the cathode body and the lead terminal was lower, and electrical resistance between the cathode body and the lead terminal was more.

The present disclosure is proposed to address the above-described problems, and the objective is to provide an electrolytic capacitor with improved connectivity between a cathode body including a carbon layer and a lead terminal, and a production method thereof.

Solution to Problem

To address the above-described problems, an electrolytic capacitor of the embodiments includes: an anode body having a dielectric layer on a surface thereof; a cathode body having a cathode foil and a carbon layer formed on the cathode foil; an electrolyte interposed between the anode body and the cathode body; and a lead terminal connected to each of the anode body and the cathode body by cold pressure welding, in which a maximum static friction coefficient of a surface of the carbon layer of the cathode body is 0.6 or more.

Furthermore, a production method of the electrolytic capacitor according to the embodiments is a production method of the electrolytic capacitor in which an anode body having a dielectric layer on a surface thereof and a cathode body face each other via an electrolyte, and includes: a cold pressure welding process of connecting the cathode body having a carbon layer formed thereon to a lead terminal by cold pressure welding, a maximum static friction coefficient of a surface of the carbon layer being 0.6 or more.

When connecting the cathode body and the lead terminal by the cold pressure welding, a cathode foil of the cathode body is highly stretchable and can be easily stretched by pressing, because the cathode foil of the cathode body is formed of metal such as aluminum foil. On the other hand, the carbon layer is less stretchable than the cathode foil, and when the maximum static friction coefficient becomes 0.6 or more, the carbon layer would be caught by a pressing component and cannot follow the stretch of the cathode foil during the cold pressure welding. This will easily cause many cracks in the carbon layer, and the cathode foil exposes from the cracks. Therefore, a flat portion of the lead terminal and a surface of the cathode foil can be connected by the pressure welding, improving the connectivity between the cathode foil and the lead terminal.

Furthermore, if the friction force on the surface of the carbon layer is small, a surface of the pressing component and the surface of the carbon layer slide during the cold pressure welding. During the cold pressure welding, a pressed region where the carbon layer and the cathode foil are in contact with the pressed region and pressure is applied is created on the carbon layer and the cathode foil, and force to move toward the outside of the pressed region is applied on an outer area of the pressed region due to sliding of the surface of the pressing component and the surface of the carbon layer. Therefore, the outer area of the pressed region does not become thinner according to the pressing, and the pressed region tends to have a shape in which the thickness of the outer area and the thickness of the other central area keenly change. In this shape, stress tends to concentrate on the portion where the thickness keenly changes, and the connection between the cathode body and the lead terminal may become insufficient. However, when the maximum static friction coefficient of the surface of the carbon layer is 0.6 or more, the pressing component does not slide on the surface of the carbon layer, and the entire pressed region of the carbon layer and the cathode foil becomes thin according to the pressing. Thus, this makes the stress difficult to concentrate on the structure, improving the connection between the cathode body and the lead terminal.

The carbon layer may include graphite at ratio of 18 wt % or less relative to the total amount of all carbon material in the carbon layer, including non. Since graphite has a sliding property, the maximum static friction coefficient of the surface of the carbon layer becomes 0.6 or more when graphite is not included or is included in the amount of 18 wt % or less. Note that the carbon layer may include spherical carbon as the carbon material.

In the cold pressure welding process, the cathode body and the lead terminal may be laminated and pressed by the pressing component, and the pressing component may include a flat surface and a side surface with an inclination angle of 120 degrees or more relative to the flat surface. Furthermore, the electrolytic capacitor may include a cold pressure welded region at a boundary surface between the cathode body and the lead terminal, and the cold pressure welded region may include an inclined surface with an inclination angle of 120 degrees or more relative to the flat surface.

When the cathode body and the lead terminal are pressed by the pressing component having the side surface inclined at 120 degrees or more, the cathode body becomes less likely to shear, and the connectivity between the cathode body and the lead terminal is improved. Furthermore, since the cold pressure welded region has the flat surface and the inclined surface with the angle of 120 degrees or more and is broad, a joining surface area becomes large, improving the connectivity between the cathode body and the lead terminal.

Effect of Invention

According to the present disclosure, the connectivity of the lead terminal and the cathode foil including the carbon layer is improved.

EMBODIMENTS

An electrode body and an electrolytic capacitor using said electrode body as a cathode according to the embodiment of the present disclosure will be described. In the present embodiment, a wound-type electrolytic capacitor having electrolytic solution will be described as an example, however the present disclosure is not limited thereto. The electrode body may be applied to any electrolytic capacitor having various electrolyte, such as electrolytic solution, a solid electrolyte layer such as conductive polymers, a gel electrolyte, or an electrolyte in which electrolytic solution is used in combination with the solid electrolyte layer and the gel electrolyte, and for example, the electrode body may be applied to a laminated-type electrolytic capacitor.

Summary of Electrolytic Capacitor

Figure 1:
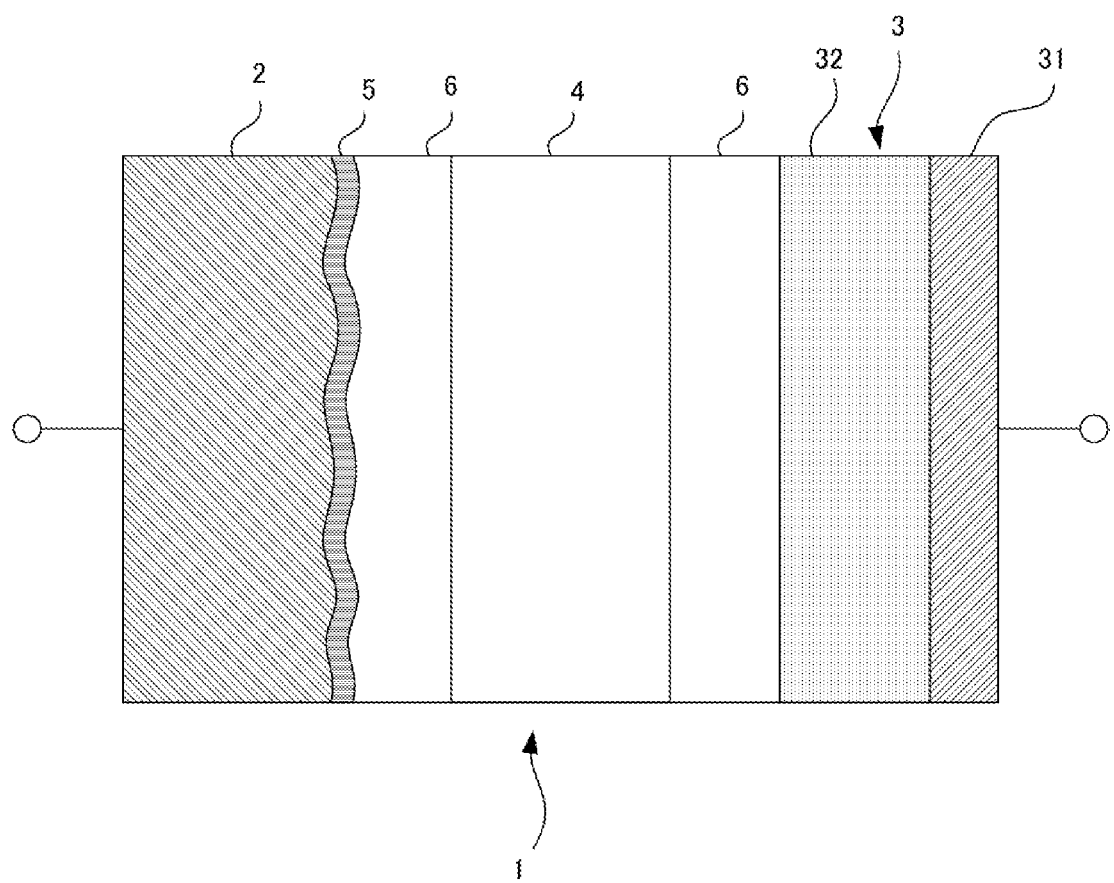
FIG. 1 is a model diagram of the electrolytic capacitor.

FIG. 1 is a model diagram of the electrolytic capacitor according to the present embodiment. An electrolytic capacitor 1 is a passive element that stores and discharges electric charges according to capacitance. The electrolytic capacitor 1 includes an anode body 2 having a dielectric layer 5 on a surface thereof, a cathode body 3 having a carbon layer 32 formed on a cathode foil 31, and a separator 4. Note that the carbon layers 32 are formed on both surfaces of the cathode foil 31. Furthermore, the anode body 2 and the cathode body 3 are strip, and are arranged to face each other via the separator 4 and are wound to form a spiral in the width direction.

The electrolytic solution 6 is filled between the anode body 2 and the cathode body 3. The electrolytic solution 6 closely contacts the dielectric oxide film 5 of the anode body 2 and the carbo layer 32 of the cathode body 3. In this electrolytic capacitor 1, cathode-side capacitance is produced by an electric double layer action produced at a boundary surface between the electrolytic solution 6 and the carbon layer 32 of the cathode body 3, and anode-side capacitance is produced at the anode body 2 by a dielectric polarization action.

Figure 2:
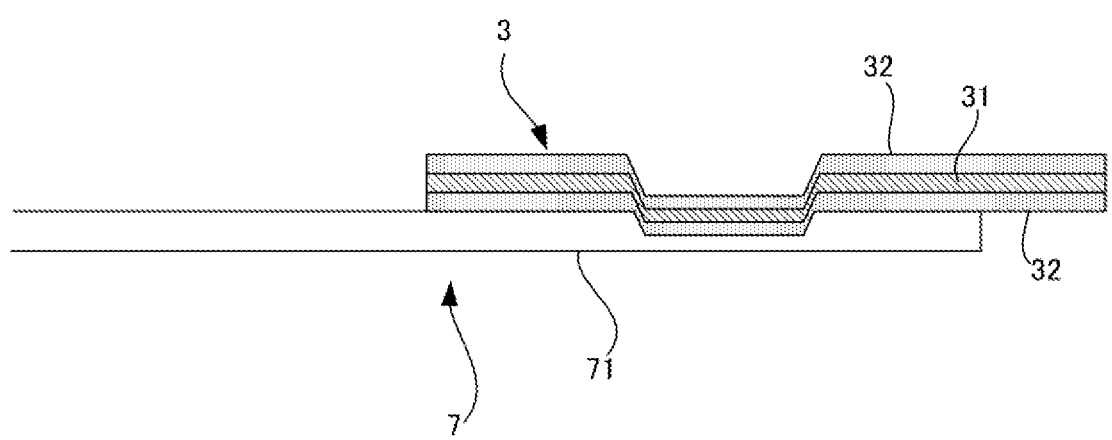
FIG. 2 is a schematic diagram illustrating a cross-section of the cathode foil.

FIG. 2 is a cross-sectional diagram of the cathode body 3. As illustrated in FIG. 2, a lead terminal 7 is electrically or mechanically connected to the cathode body 3 by cold pressure welding. Similarly, another lead terminal 7 is electrically or mechanically connected to the anode body 2 by cold pressure welding. The electrolytic capacitor 1 is implemented on an electric circuit or an electronic circuit via the lead terminal 7.

The lead terminal 7 is a metal component including a flat portion 71, and for example, is formed of aluminum and has a flat plate shape or a flat wire shape. One end of the lead terminal 7 is brought into contact with the cathode body 3 so that a surface pf the flat portion 71 contacts with one surface of the cathode body 3. Furthermore, the lead terminal 7 protrudes from the cathode body 3 so that the lead terminal 7 orthogonally intersects with a lengthwise side of the cathode body 3. Finally, the lead terminal 7 and the cathode body 3 is connected by cold pressure welding. The connection method for the lead terminal 7 and the anode body 2 is the same. Note that the lead terminal 7 only need to have the flat portion 71, and may be formed by crushing one end of a round bar portion to form the flat portion 71 by pressing process and connecting other end of the round bar portion to metal wire by arc welding, etc.

Cathode Body

The cathode body 3 includes a laminated structure of the cathode foil 31 and the carbon layer 32. The cathode foil 31 acts as a current collector, and an enlarged surface layer is formed on the surface thereof. The carbon layer 32 includes carbon material as the main material. The carbon layer 32 adheres to the enlarged surface layer, forming the laminated structure of the cathode foil 31 and the carbon layer 32. The carbon layer 32 is positioned on an outermost surface of the cathode body 3.

The cathode foil 31 is a long foil body formed of valve acting metal. The valve acting metal is aluminum, tantalum, niobium, titanium, hafnium, zirconium, zinc, tungsten, bismuth, and antimony, etc. Purity of the cathode foil 31 is desirably about 99% or more, and impurities such as silicon, iron, copper, magnesium, and zinc may be included. For example, the cathode foil 31 may be aluminum material having a temper designation of H defined in JIS standard H0001, that is, H material, or aluminum material having a temper designation of O defined in JIS standard H0001, that is, O material. When highly rigid metal foil formed of H material is used, deformation of the cathode foil 31 due to press processing can be suppressed.

Surface enlargement process is performed on the metal foil of the cathode foil 31 that is the stretched valve action metal. An enlarged surface layer is formed by electrolytic etching, chemical etching, or sandblasting, etc., or formed by vapor-depositing or sintering metal particles, etc., on the metal foil. The electrolytic etching may be DC etching or AC etching. Furthermore, in chemical etching, the metal foil is immersed in acidic solution or alkaline solution. The formed enlarged surface layer is a layer region having tunnel-shaped etching pits dug from the foil surface toward the foil core portion, or spongy etching pits. Note that the etching pits may be formed so as to penetrate the cathode foil 31.

The oxide film may be formed on the enlarged surface layer may be naturally or intentionally. The natural oxide film is naturally formed when the cathode foil 31 reacts with oxygen in the air, and the chemical film is oxide film intentionally formed by chemical conversion treatment of applying voltage in solution without halogen ions such as aqueous solution of adipic acid or boric acid. When the metal foil is aluminum foil, the oxide film by this method is aluminum oxide which is an oxidized enlarged surface layer.

The carbon layer 32 includes carbon material that causes electric double layer action. A maximum static friction coefficient of the surface of the carbon layer 32 is adjusted to be 0.6 or more. By making the maximum static friction coefficient of the surface of the carbon layer 32 to become 0.6 or more, the connectivity between the lead terminal 7 and the cathode body 3 having the carbon layer 32 is improved. Although the following mechanism is assumption and are not limited thereto, it is considered that the connectivity between the lead terminal 7 and the cathode body 3 having the carbon layer 32 is improved by the following reason.

That is, when connecting the cathode body 3 and the lead terminal 7 by the cold pressure welding, the cathode foil 31 of the cathode body 3 is highly stretchable and can be easily stretched by pressing, because the cathode foil 31 of the cathode body 3 is formed of metal such as aluminum foil. On the other hand, the carbon layer 32 is less stretchable than the cathode foil 31, and when the maximum static friction coefficient becomes 0.6 or more, the carbon layer 32 would be caught by a pressing component and cannot follow the stretch of the cathode foil 31 during the cold pressure welding. Accordingly, many cracks would be produced in the carbon layer 32, and the cathode foil 31 exposes from the cracks of the carbon layer 32. Therefore, a flat portion 71 of the lead terminal 7 and the surface of the cathode foil 31 can be joined via the cracks, improving the connectivity between the cathode body 3 and the lead terminal 7. Thus, the maximum static friction coefficient of the surface of the carbon layer 32 is adjusted to be 0.6 or more, so as to make the surface of the carbon layer 32 easier to be caught by the lead terminal 7.

Furthermore, if the friction force on the surface of the carbon layer 32 is small, a surface of the pressing component and the surface of the carbon layer 32 slide during the cold pressure welding. During the cold pressure welding, a pressed region where the carbon layer 32 and the cathode foil 31 are in contact with the pressed region and pressure is applied is created on the carbon layer 32 and the cathode foil 31, and force to move toward the outside of the pressed region is applied on an outer area of the pressed region due to sliding of the surface of the pressing component and the surface of the carbon layer 32. Therefore, the outer area of the pressed region does not become thinner according to the pressing, and the pressed region tends to have a shape in which the thickness of the outer area and the thickness of the other central area keenly change. In this shape, stress tends to concentrate on the portion where the thickness keenly changes, and the connection between the cathode body 3 and the lead terminal 7 may become insufficient. However, when the maximum static friction coefficient of the surface of the carbon layer 32 is 0.6 or more, the pressing component does not slide on the surface of the carbon layer 32, and the entire pressed region of the carbon layer 32 and the cathode foil 31 becomes thin according to the pressing. Thus, this makes the stress difficult to concentrate on the structure, improving the connection between the cathode body 3 and the lead terminal 7.

The carbon material included in the carbon layer 32 is fibrous carbon, carbon powder, or a mixture thereof. The fibrous carbon and carbon powder may be treated with porous treatment, such as opening treatment to form pores or activation treatment. The fibrous carbon is carbon nanotube, or carbon nanofiber, etc. The carbon nanotube may be single-walled carbon nanotube with a single layer of a graphene sheet, or multi-walled carbon nanotube (MWCNTs) in which two or more layers of graphene sheets are curled up on a same axis and a tube wall forms multiple layers. The carbon powder is natural plant tissues such as coconut palms, synthetic resins such as phenol, activated carbon derived from fossil fuels such as coal, coke, or pitch, carbon black such as Ketjen black, acetylene black, channel black, or thermal black, carbon nanohorn, amorphous carbon, or mesoporous carbon. For example, fibrous carbon is carbon nanotube or carbon nanofiber, etc. In the electrolytic capacitor 1 using the electrolytic solution 6 as the electrolyte, it is preferable that the carbon material exhibits electric double layer action.

In particular, it is preferable that the carbon material is spherical carbon. It is preferable to include one or two types of spherical carbon in the carbon layer 32 as the carbon material. A diameter of the spherical carbon is small, and it is easy for the spherical carbon to enter to deeper portion of the enlarged surface layer formed on the cathode foil 31, such that the carbon layer 32 adheres the cathode foil 31. For example, the spherical carbon may be carbon black. The carbon black may be Ketjen black, acetylene black, channel black, and thermal black, etc., an average primary particle diameter of the carbon black is preferably 100 nm or less, and a specific surface area calculated by BET theory (hereinafter referred to as a BET specific surface area) is preferably 200 $m^2/g$ or less. For example, the carbon black with the BET specific surface area of 200 $m^2/g$ or less is acetylene black.

Graphite may be added to the carbon layer 32 as the carbon material, together with other carbon material. In particular, the carbon material added together with graphite is preferably spherical carbon. It is preferable that the graphite is flake or vein graphite and has an aspect ratio between short and long diameters in a range of 1:5 to 1:100. When the carbon layer 32 including this combination of the carbon material is laminated on the cathode foil 31, the spherical carbon becomes easier to be rubbed into pores of the enlarged surface layer by the graphite. The graphite easily deforms along an uneven surface of the enlarged surface layer and is easily laminated on the uneven surface. Accordingly, the graphite acts as a pressing lid that presses and holds the spherical carbon that has been rubbed into the pores. Thus, adhesion and fixity of the carbon layer 32 and the cathode foil 31 are improved.

Here, since the sliding property of the graphite is high, the maximum static friction coefficient of the surface of the carbon layer 32 can be adjusted by adjusting the amount of the graphite. The carbon layer 32 may not include the graphite or may include graphite at ratio of 18 wt % or less relative to the total amount of all carbon material in the carbon layer 32. By this, the maximum static friction coefficient of the surface of the carbon layer 32 becomes 0.6 or more.

The cathode body 3 is produced by a cathode body production process. In the cathode body production process, slurry including the material of the carbon layer 32 is produced, the enlarged surface layer is formed on the cathode foil 31, and the slurry is applied on the enlarged surface area and is dried. Regarding the carbon layer 32, the carbon material is dispersed in a solvent, and a binder is added to prepare the slurry. Before producing the slurry, the average particle diameter of the carbon material may be adjusted by crushing the carbon material by crushing means such as bead mill and a ball mill. The solvents may be alcohols such as methanol, ethanol, and 2-propanol, hydrocarbon solvents, aromatic solvents, amide solvents such as N-methyl-2-pyrrolidone (NMP) and N,N-dimethylformamide (DMF), water and mixtures thereof. As the dispersion method, a mixer, jet mixing (jet collision), ultracentrifugation treatment, or others such as ultrasonic treatment may be used. In the dispersion process, the graphite, the spherical carbon, and the binder in the mixed solution are subdivided and homogenized, and dispersed in the solution. The binder may be, for example, styrene butadiene rubber, polyvinylidene difluoride, or polytetrafluoroethylene.

The slurry is applied on the cathode foil 31 by slurry casting, doctor blading, or spray spraying, etc. After the application, the solvent is volatilized by drying. Alternatively, the carbon layer 32 is formed into a sheet by papermaking and is placed on the cathode foil 31. In the papermaking, the sheet is produced by dispersing the carbon material to be included in the carbon layer 32 in the dispersing solvent, adding the binder if necessary, and after depressurization, filtering, and drying, peeling off deposited material from a filter paper.

Other formation method of the carbon layer 32 on the cathode foil 31 may be vacuum vapor-deposition, sputtering, ion plating, CVD, electrolytic plating, or electroless plating, etc. In the case of vapor-deposition, the carbon material is evaporated by electrical heating in vacuum or is evaporated by electron beam irradiation in vacuum, and film of the carbon material is formed on the cathode foil. Furthermore, in the case of the sputtering, the cathode foil and a target formed of the carbon material are placed in a vacuum container, and inert gas is introduced into the vacuum container and voltage is applied to bombard the target with the plasma inert gas, so that particles of carbon material beaten out from the target is deposited on the cathode foil.

After the carbon layer 32 is formed on the cathode foil 31, the cathode foil 31 and the carbon layer 32 are pressed together by predetermined press pressure. In the press processing, a laminate of carbon layer 32 and cathode foil 31 is sandwiched by a press roller, and press linear pressure is applied. The press pressure is desirably about 0.01 to 100 t/cm. When the carbon material of the carbon layer 32 is the graphite and the spherical carbon, the graphite and the spherical carbon are laid down and aligned by the pressing. Furthermore, by the pressing, the graphite of the carbon layer 32 deforms to follow the uneven surface of the enlarged surface layer. Furthermore, by the pressing, stress of pressure welding is applied on the graphite deformed along the uneven surface of the enlarged surface layer, and the spherical carbon between the graphite and the enlarged surface layer is pushed into the pores. Thus, the adhesion of the carbon layer 32 and the cathode foil 31 is improved.

Figure 3:
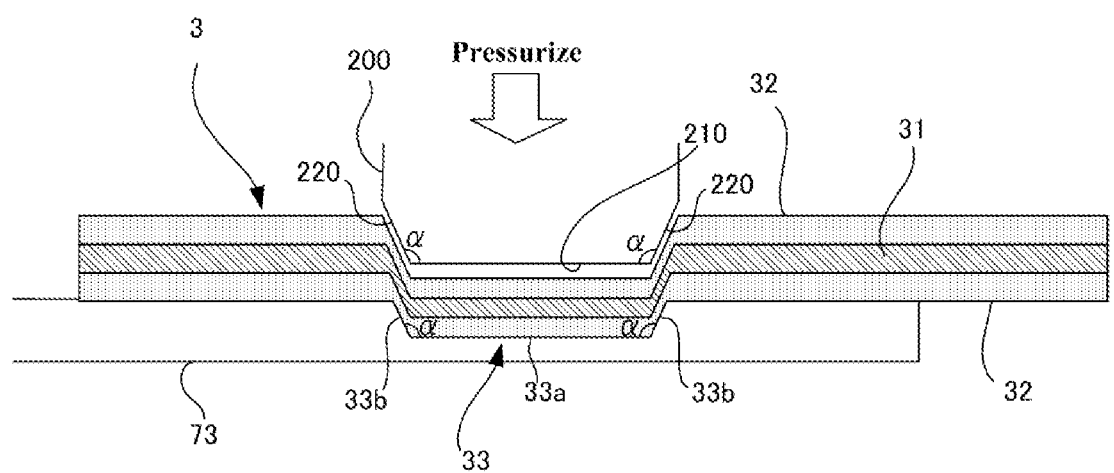
FIG. 3 is a schematic diagram illustrating a connection process using cold pressure welding.

The produced cathode body 3 is connected to the lead terminal 7 through cold pressure welding. FIG. 3 is a schematic diagram illustrating cold pressure welding of the produced cathode body 3 and the lead terminal 7. As illustrated in FIG. 3, the produced cathode body 3 is laminated on the flat portion 7 of the lead terminal 7. Then, in non-heating condition, a pressing component 200 is pressed against the cathode body 3 and the flat portion 71 of the lead terminal 7 and pressurizes the cathode body 3 and the flat portion 71 of the lead terminal 7 in the lamination direction.

It is preferable that the pressing component 200 has a trapezoidal tip. That is, a tip of the pressing component is formed by a flat surface 210 and a side surface 220. It is preferable that the side surface 220 is connected to the flat portion 210, falls down outside the pressing component 200, and is inclined at an angle α of 120 degrees or more relative to the flat surface 210. When the side surface 220 is inclined at the angle of 120 degrees or more, shear stress applied on a cold pressure welded region 33 pressed against the pressing component 200 is reduced. That is, the cathode body 3 would not rupture partly or entirely between the cold pressure welded region 33 and surrounding thereof, and the connectivity between the cathode body 3 and the lead terminal 7 can be maintained well.

Note that the cold pressure welded region 33 is a region joined by cold pressure welding among the boundary between the cathode body 3 and the lead terminal 7, and is a region where the pressing component 200 is projected at the boundary surface of the cathode body 3 and the lead terminal 7.

The cold pressure welded region 33 has a flat surface 33a and an inclined surface 33b by the pressing component 200 having trapezoidal shape with an inclined angle of 120 degrees or more. The flat surface 33a is a region created by abutting with the flat portion 210 of the pressing component, and the inclined surface 33b is created by abutting with the side surface 220 of the pressing component 200. Therefore, the angle formed between the inclined surface 33b falling down outward and the flat surface 33a is the angle α, which is the same in the pressing component 200. Thus, the area of the cold pressure welded region 33 becomes large, and the connectivity between the cathode body 3 and the lead terminal 7 is further improved.

Anode Body 2

Next, the anode body 2 is a long foil body formed of valve acting metal. Purity of the anode body 2 is preferably about 99.9% or more. This anode body 2 is formed by etching stretched foil, or sintering powder of the valve acting metal, or vapor-depositing film of metal particles or the like on the foil to form the film. The anode body 2 has an etching layer or porous structure on a surface thereof.

Dielectric oxide film 5 formed on the anode body 2 is typically oxide film formed on the surface layer of the anode body 2, and when the anode body 2 is formed of aluminum, the dielectric oxide film is an aluminum oxide layer obtained by oxidizing a porous structure region. This dielectric oxide film 5 is formed by chemical conversion treatment in which voltage is applied in solution without halogen ions such as aqueous solution of ammonium borate, ammonium phosphate, ammonium adipate, or combinations thereof.

Separator

A separator 4 may be cellulose such as kraft, Manila hemp, esparto, hemp, and rayon, and mixed papers thereof, polyester resins such as polyethylene terephthalate, polybutylene terephthalate, polyethylene naphthalate, and derivatives thereof, polytetrafluoroethylene resin, polyvinylidene fluoride resin, vinylon resin, polyamide resin such as aliphatic polyamides, semi-aromatic polyamides, and fully aromatic polyamides, polyimide resin, polyethylene resin, polypropylene resin, trimethylpentene resin, polyphenylene sulfide resin, acrylic resin, and etc., and these resin may be used in single or in combination and may be mixed and used with cellulose.

Electrolytic Solution

The electrolytic solution is mixed solution in which a solute is dissolved in a solvent and additives are added if necessary. The solvent may be either a protic organic polar solvent or an aprotic organic polar solvent. Typical protic polar solvents are monohydric alcohol, polyhydric alcohol, oxyalcohol compounds, and water. Typical aprotic organic polar solvents are sulfones, amides, lactones, cyclic amides, nitriles, and sulfoxides.

The solute included in the electrolytic solution 6 includes anion and cation components, and is typically organic acid or salts thereof, inorganic acid or salts thereof, or composite compounds of the organic acid and the inorganic acid or ion-dissociative salts thereof, and is used in single or in combination of two or more. Acid that is the anion and base as the cation may be separately added to the electrolytic solution as solute components.

Furthermore, other additives may be added to the electrolytic solution. Additives include polyethylene glycol, complex compounds of boric acid and polysaccharides (mannit, sorbit, etc.), complex compounds of boric acid and polyhydric alcohol, borate esters, nitro compounds (o-nitrobenzoic acid, m-nitrobenzoic acid, p-nitrobenzoic acid, o-nitrophenol, m-nitrophenol, p-nitrophenol, etc.), phosphate esters, etc. These may be used in single or in combination of two or more.

Although the electrolytic capacitor using the electrolytic solution 6 is described, if a solid electrolyte is used, the solid electrolyte is conducted by the carbon layer 32, and the capacitance of the electrolytic capacitor at the anode-side is formed by the dielectric polarization action. If the solid electrolyte is used, polythiophenes such as polyethylenedioxythiophene, and conductive polymers such as polypyrroles and polyanilines may be used.

Hereinafter, the present disclosure will be described in more detail based on examples. Note that the present disclosure is not limited to the following examples.

Examples 1 and 2

Production of Cathode Body

The cathode bodies 3 for the electrolytic capacitors 1 of examples 1 and 2 and comparative examples 1 to 3 were produced as follows. Firstly, the carbon material included in the carbon layer 3 was mixtures of graphite and carbon black that is one kind of spherical carbon, or only carbon black. Powder of the graphite, the carbon black, and styrene butadiene rubber (SBR) were added to sodium carboxymethyl cellulose (CMC-Na) aqueous solution that is aqueous solution containing a dispersing agent, and were kneaded to produce a slurry. The formulation ratio of the carbon material, the binder, and the aqueous solution containing the dispersing agent were 84:10:6 in weight.

Meanwhile, aluminum foil was prepared as the cathode foil 31, and the slurry was applied uniformly on the cathode foil 31. Voltage had been applied to the aluminum foil in hydrochloric acid beforehand to form the enlarged surface layer. The surface area of the cathode foil 31 was enlarged 22 times by the enlarged surface layer. The depth of the enlarged surface layer was 4 μm on one side and 8 μm on both side in total, and the thickness of a foil core portion on which enlarged surface layer had not been formed was remained 12 μm. Note that the depth of the enlarged surface layer was an average of the depth from the surface of the cathode foil 31 to the deepest portion of the etching pits. The thickness of the foil core portion was an average of the thickness of the layer to which the etching pits had not reached.

The slurry including the graphite and the carbon black or the slurry including only the carbon black were applied on the cathode foil 31. The slurry was applied on the enlarged surface layer of the cathode foil 31. After drying the slurry, the carbon layer 32 was fixed on the cathode foil 31 by vertical pressing at a pressure of 150 kNcm$^{-2}$.

The cathode bodies 3 of the examples 1 and 2 and the comparative examples 1 to 3 were different in the mixture ratio of the graphite and the carbon black as indicated in the below Table 1. Note that the carbon material included in the carbon layer of the examples 1 and 2 and the comparative examples 1 to 3 was only the graphite and the carbon black, and values according to the graphite in the below Table 1 can also be referred to as a weight ratio based on all carbon material included in the carbon layer 32.

TABLE 1

|  | Graphite | Carbon Black |
|---|---|---|
| Comparative Example 1 | 75 | 25 |
| Comparative Example 2 | 56.25 | 43.75 |
| Comparative Example 3 | 37.5 | 62.5 |
| Example 1 | 18.75 | 81.25 |
| Example 2 | 0 | 100 |

Measurement of Maximum Friction Coefficient

The maximum static friction coefficient μ of the surface of respective carbon layers 32 of the cathode bodies 3 of the examples 1 and 2 and the comparative examples 1 to 3 were measured as follows. That is, the maximum static friction coefficient μ was measured by horizontal linear reciprocating sliding method in accordance with JIS standard P-8147"Friction Coefficient Testing Method for Paper and Paperboard". In detail, solvent spun rayon (NIPPON KODOSHI CORPORATION; TEF (thickness of 40 μm and density of 0.40 g/cm$^3$)), felt, and a 200 g spindle were placed on each cathode body 3 in sequence, and the solvent spun rayon was pulled at a speed of 100 mm/min. The traction force was gradually increased, and force at the moment the solvent spun rayon moved was detected by a load cell (Kyowa Electronic Instruments: Model LUX-B) as the maximum static friction force (N). The maximum static friction force (N) was divided by the normal force (N) which the solvent spun rayon had received from the cathode body 3 by the spindle to calculate the maximum static friction coefficient of the surface of the carbon layer 32 of the cathode body 3.

The maximum static friction coefficient μ of the surface of respective carbon layers 32 of the cathode bodies 3 of the examples 1 and 2 and the comparative examples 1 to 3 are indicated in the below Table 2.

TABLE 2

|  | Maximum Static Friction Force (N) | Maximum Static Friction Coefficient (μ) |
|---|---|---|
| Comparative Example 1 | 0.65 | 0.33 |
| Comparative Example 2 | 0.81 | 0.41 |
| Comparative Example 3 | 0.99 | 0.51 |
| Example 1 | 1.16 | 0.60 |
| Example 2 | 1.40 | 0.71 |

As shown in the above Table 2, the maximum static friction coefficients μ of the examples 1 and 2 were 0.6 or more. The graphite content in the example 1 is 18.75 wt % relative to the total amount of graphite and the carbon black, that is, all carbon material, and in the example 2, the graphite was not added. Therefore, it was observed that if the content of the graphite relative to the carbon layer 32 was 18 wt % or lower based on all carbon material, the maximum static friction coefficient μ of the surface of the carbon layer 32 became 0.6 or more.

Cold Pressure Welding

Next, the lead terminals 7 were connected to the cathode bodies 3 of the examples 1 and 2 and the comparative examples 1 to 3 by the cold pressure welding. The flat portion 71 of the lead terminal 7 and the cathode body 3 were laminated and were pressurized in the lamination direction from the cathode-body-3 side by a pressing component 200. The pressing component 200 had a trapezoidal tip, and an angle formed between a flat surface 210 and a side surface 220 were 120 degrees.

Connection Strength Test

The cathode body 3 was fixed with the lead terminal 7 placed thereon, and the tip side of the lead terminal 7 protruding from the cathode body 3 was pulled upward. Then, maximum tensile strength produced until the flat portion 71 of the lead terminal 7 was pulled off from respective cathode foil 3 was measured as the connection strength by the load cell (Kyowa Electronic Instruments: Model LUX-B). Note that the positions of all points of effort were tha same.

Figure 4:
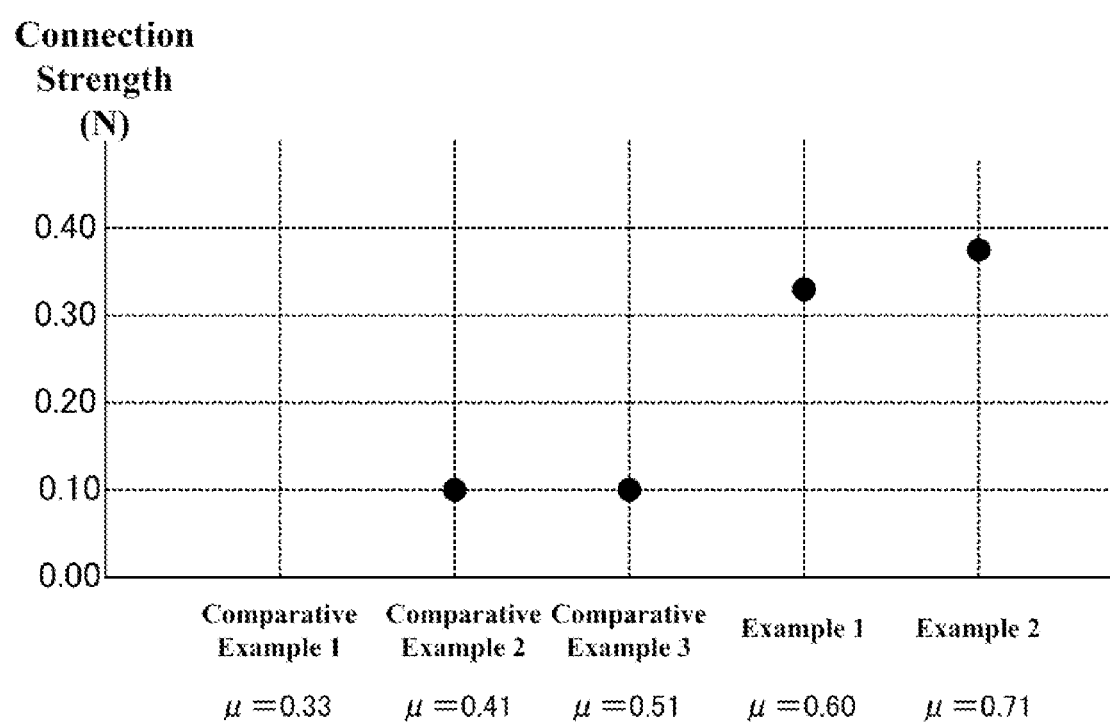
FIG. 4 is a graph indicating connection strength for each maximum static friction coefficient when cold pressure welding is performed using a trapezoidal-shaped pressing component having side surfaces with an inclination angle of 120 degrees.

Results of the connection strength test is shown in the below Table 3. Also, results of an average value of the below Table 3 are shown in FIG. 4. Note that three cathode bodies 3 were produced each and were each tested of the connection strength, and three averages were calculated. X-marks in the below Table 3 indicates non-connection.

TABLE 3

| Cold Pressure Welding by 120 Degrees Pressing Component ||||||
|---|---|---|---|---|---|
|  | Comparative Example 1 (μ = 0.33) | Comparative Example 2 (μ = 0.41) | Comparative Example 3 (μ = 0.51) | Example 1 (μ = 0.60) | Example 2 (μ = 0.71) |
| Body 1 | X | 0.10N | 0.10N | 0.30N | 0.40N |
| Body 2 | X | X | 0.10N | 0.30N | 0.40N |
| Body 3 | X | X | 0.10N | 0.40N | 0.30N |
| Average | X | 0.10N | 0.10N | 0.33N | 0.37N |

Firstly, the cathode body 3 of the comparative example 1 with the maximum static friction coefficient of 0.33 was completely sheared during the cold pressure welding by the pressing component 200 having the side surfaces 220 inclined at the angle of 120 degrees, and therefore was not connected to the lead terminal 7. Only one among three cathode bodies 3 of the comparative example 2 with the maximum static friction coefficient of 0.41 was not sheared and was connected to the lead terminal 7.

Therefore, as shown in the above Tables 3 and 4, it was observed that the connection strength was completely different between the comparative examples 1 to 3 with the maximum static friction coefficient of 0.5 or less, and the examples 1 and 2 with the maximum static friction strength of 0.6 or more. If the maximum static friction coefficient was at least 0.51 or less, the connection strength was not improved even when the maximum static friction coefficient had increased, and if the maximum static friction coefficient was 0.6 or more, the connection strength was largely improved in comparison with the case in which the maximum static friction coefficient was 0.51 or less.

Contact Resistance Test

A portion of the lead terminal 7 protruding from the cathode body 3 and the cathode body 3 were connected to each pole terminal of a resistance meter. The cathode body 3 was fixed with the lead terminal 7 placed thereon, and contact resistance was measured for each case of when the lead terminal 7 was lifted up by 0.8 mm, and when the lead terminal 7 was lifted up by 0.0 mm, that is, when the lead terminal 7 was not lifted up. Model Number: RM3545 from HIOKI E.E. CORPORATION was used as the resistance meter. Measurement results indicates the resistance value of the cathode body 3, the resistance value of the lead terminal 7, and the contact resistance. The resistance value of the cathode body 3 and the resistance value of the lead terminal 7 were the same in the comparative examples 1 to 3 and the examples 1 to 2.

Figure 5:
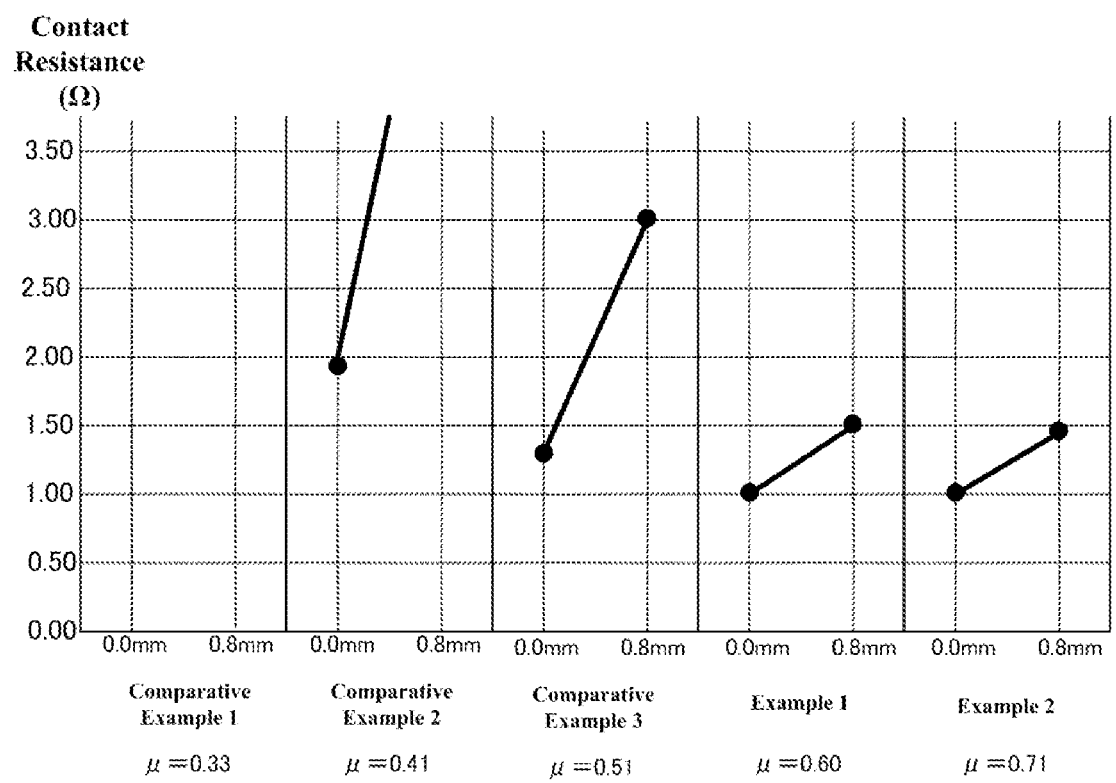
FIG. 5 is a graph indicating contact resistance for each maximum static friction coefficient when cold pressure welding is performed using a trapezoidal-shaped pressing component having side surfaces with an inclination angle of 120 degrees.

Results of the connection strength test is shown in the below Table 4. Also, results of an average value of the below Table 4 are shown in FIG. 5. Note that three cathode bodies 3 were produced each, the contact resistance test was performed for each cathode body 3 for the cases in which the cathode body 3 was lifted up by 0.0 mm and 0.8 mm, and the average for three tests was calculated. In the below Table 3, the x marks indicates that the cathode body 3 was not connected for the shear and the contact resistance were not measured, and the values are resistance values (mΩ) obtained in the tests.

Since the resistance value of the cathode body 3 and the resistance value of the lead terminal 7 were the same in the comparative examples 1 to 3 and the examples 1 to 2, differences shown in the Table 4 and FIG. 5 are differences in the contact resistance. As shown in the Table 4 and FIG. 5, up to the comparative example 3 with the maximum static friction coefficient of 0.51 or less, the difference in the contact resistance was large between the cases in which the cathode bodies 3 were lifted up by 0.0 mm and 0.8 mm. However, when the maximum static friction coefficient was 0.6 or more, the contact resistance when the cathode body 3 was lifted up by 0.8 mm decreased, and the difference in the contact resistance was small between the cases in which the cathode bodies 3 were lifted up by 0.0 mm and 0.8 mm. Thus, when the maximum static friction coefficient of the surface of the carbon layer 32 was 0.6 or more, the contact resistance was largely improved in comparison with when the maximum static friction coefficient was 0.51 or less.

Modified Example of Pressing Component

The cathode bodies 3 for the electrolytic capacitor 1 of the comparative examples 1 to 3 and the examples 1 and 2 were connected to the lead terminal 7 by the cold pressure welding using the pressing component 200 having the side surfaces 220 with different inclined angle. The flat portion 71 of the lead terminal 7 and the cathode body 3 were laminated and were pressurized in the lamination direction from the cathode-body-3 side by the pressing component 200 with trapezoidal shape with the angle of 150 degrees between the flat surface 210 and the side surface 220.

After connecting the cathode body 3 and the lead terminal 7 by performing the cold pressure welding by the pressing component 200 with the side surface 220 inclined at the angle of 150 degrees, the connection strength test and the contact resistance test were performed. The method and condition for the connection strength test and the contact resistance test were the same as the tests using the pressing component 200 with the side surface 220 inclined at the angle of 120 degrees. Results of the connection strength test is shown in the below Table 5, and results of the average value of the contact resistance test is shown in the below Table 6. Also, results of the average value of the below Table 5 are shown in a graph of FIG. 6, and results of the below Table 6 are shown in a graph of FIG. 7. In the below Tables 5 and 6, the x marks indicates that the cathode body 3 was not connected for the shear and the contact resistance were not measured, and in the below Table 6, the values are resistance values (mΩ) obtained in the tests.

TABLE 4

Cold Pressure Welding by 120 Degrees Pressing Component

| | Comparative Example 1 ($\mu = 0.33$) | | Comparative Example 2 ($\mu = 0.41$) | | Comparative Example 3 ($\mu = 0.51$) | | Example 1 ($\mu = 0.60$) | | Example 2 ($\mu = 0.71$) | |
|---|---|---|---|---|---|---|---|---|---|---|
| | 0.0 mm | 0.8 mm | 0.0 mm | 0.8 mm | 0.0 mm | 0.8 mm | 0.0 mm | 0.8 mm | 0.0 mm | 0.8 mm |
| Body 1 | X | X | 1.88 | 101.30 | 1.39 | 3.00 | 1.04 | 1.49 | 1.04 | 1.34 |
| Body 2 | X | X | X | X | 1.07 | 3.10 | 1.06 | 1.45 | 1.05 | 1.40 |
| Body 3 | X | X | X | X | 1.40 | 2.96 | 1.02 | 1.65 | 1.10 | 1.65 |
| Average | X | X | 1.88 | 101.30 | 1.29 | 3.02 | 1.04 | 1.53 | 1.06 | 1.46 |

TABLE 5

Cold Pressure Welding by 150 Degrees Pressing Component

|  | Comparative Example 1 ($\mu$ = 0.33) | Comparative Example 2 ($\mu$ = 0.41) | Comparative Example 3 ($\mu$ = 0.51) | Example 1 ($\mu$ = 0.60) | Example 2 ($\mu$ = 0.71) |
| --- | --- | --- | --- | --- | --- |
| Body 1 | 0.20N | 0.30N | 0.50N | 0.60N | 0.80N |
| Body 2 | 0.20N | 0.30N | 0.30N | 0.50N | 0.90N |
| Body 3 | X | 0.40N | 0.40N | 0.50N | 1.00N |
| Average | 0.20N | 0.30N | 0.40N | 0.60N | 0.90N |

TABLE 6

Cold Pressure Welding by 150 Degrees Pressing Component

|  | Comparative Example 1 ($\mu$ = 0.33) | | Comparative Example 2 ($\mu$ = 0.41) | | Comparative Example 3 ($\mu$ = 0.51) | | Example 1 ($\mu$ = 0.60) | | Example 2 ($\mu$ = 0.71) | |
| --- | --- | --- | --- | --- | --- | --- | --- | --- | --- | --- |
|  | 0.0 mm | 0.8 mm | 0.0 mm | 0.8 mm | 0.0 mm | 0.8 mm | 0.0 mm | 0.8 mm | 0.0 mm | 0.8 mm |
| Body 1 | 1.36 | 1.42 | 1.01 | 1.45 | 1.01 | 1.31 | 0.88 | 0.90 | 1.07 | 1.14 |
| Body 2 | 1.38 | 2.71 | 0.99 | 1.40 | 1.01 | 1.40 | 0.99 | 0.96 | 1.00 | 1.02 |
| Body 3 | X | X | 1.02 | 1.41 | 0.96 | 1.36 | 0.89 | 0.91 | 0.99 | 0.96 |
| Average | 1.37 | 2.06 | 1.01 | 1.42 | 0.99 | 1.36 | 0.92 | 0.92 | 1.02 | 1.04 |

In the comparative example 2 in which some of the cathode bodies 3 was sheared when the the cold pressure welding was performed by the pressing component 200 with the side surfaces 220 inclined at the angle of 120 degrees, all three cathode bodies 3 was not sheared and was connected to the lead terminal 7. Furthermore, in the comparative example 1 in which all cathode bodies 3 was sheared when the cold pressure welding was performed by the pressing component 200 with the side surfaces 220 inclined at the angle of 120 degrees, two among three cathode bodies 3 were not sheared and was connected to the lead terminal.

In contrast, there was an attempt to connect the cathode bodies 3 of the comparative examples 1 to 3 and the examples 1 and 2 to the lead terminal 7 by the cold pressure welding using the pressing component 200 in which an angle formed between the flat surface 210 and the side surface 220 was 90 degrees. However, all cathode bodies 3 of the comparative examples 1 to 3 and the examples 1 and 2 were sheared and was not connected to the lead terminal 7.

That is, it was observed that, by performing the cold pressure welding by the pressing component 200 having the side surface 220 inclined at the angle of 120 degrees or more, the cathode body 3 in which the maximum static friction coefficient of the surface of the carbon layer 32 was 0.6 or more was not sheared and was connected to the lead terminal 7.

Figure 6:
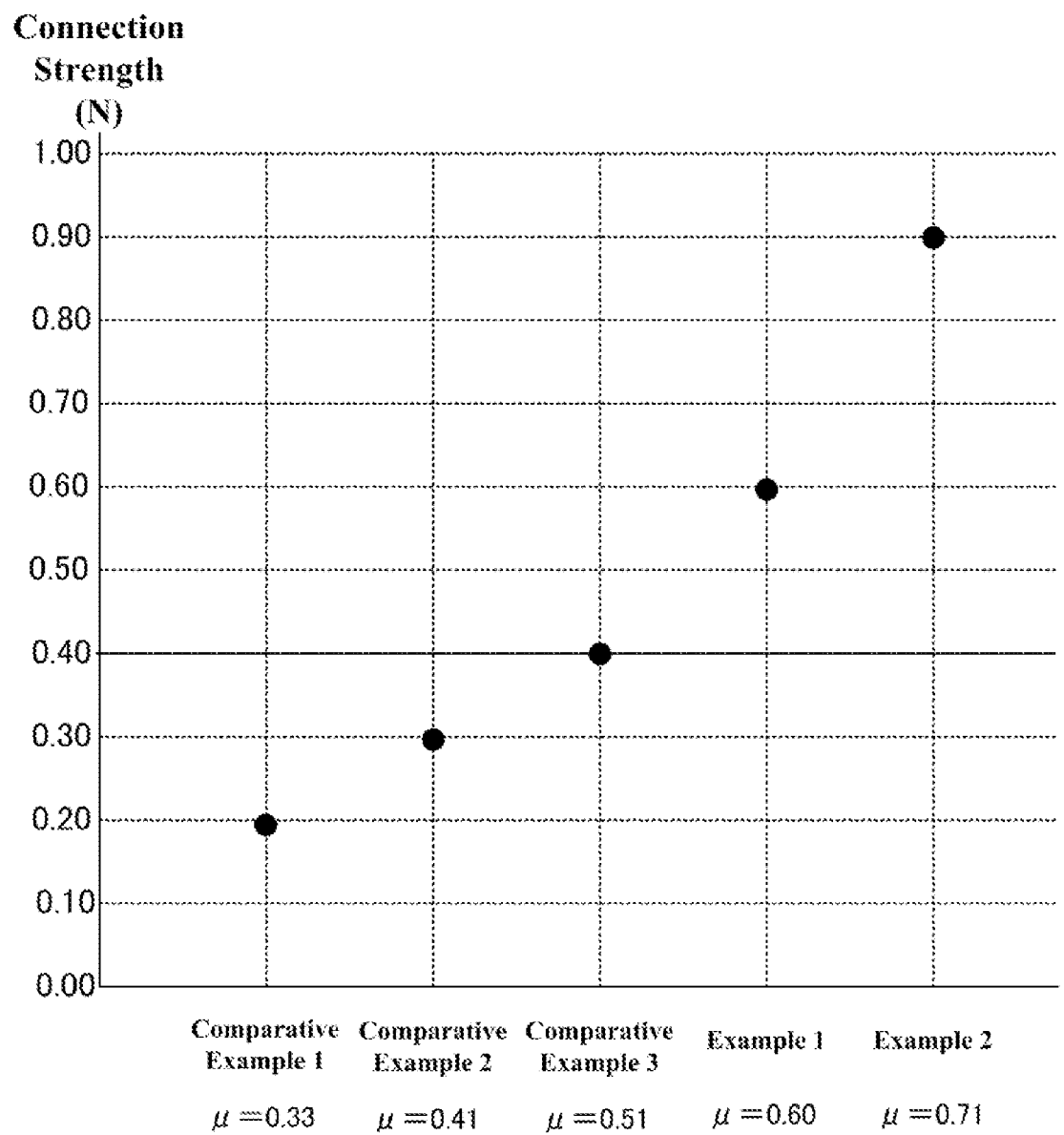
FIG. 6 is a graph indicating connection strength for each maximum static friction coefficient when cold pressure welding is performed using a trapezoidal-shaped pressing component having side surfaces with an inclination angle of 150 degrees.
Figure 7:
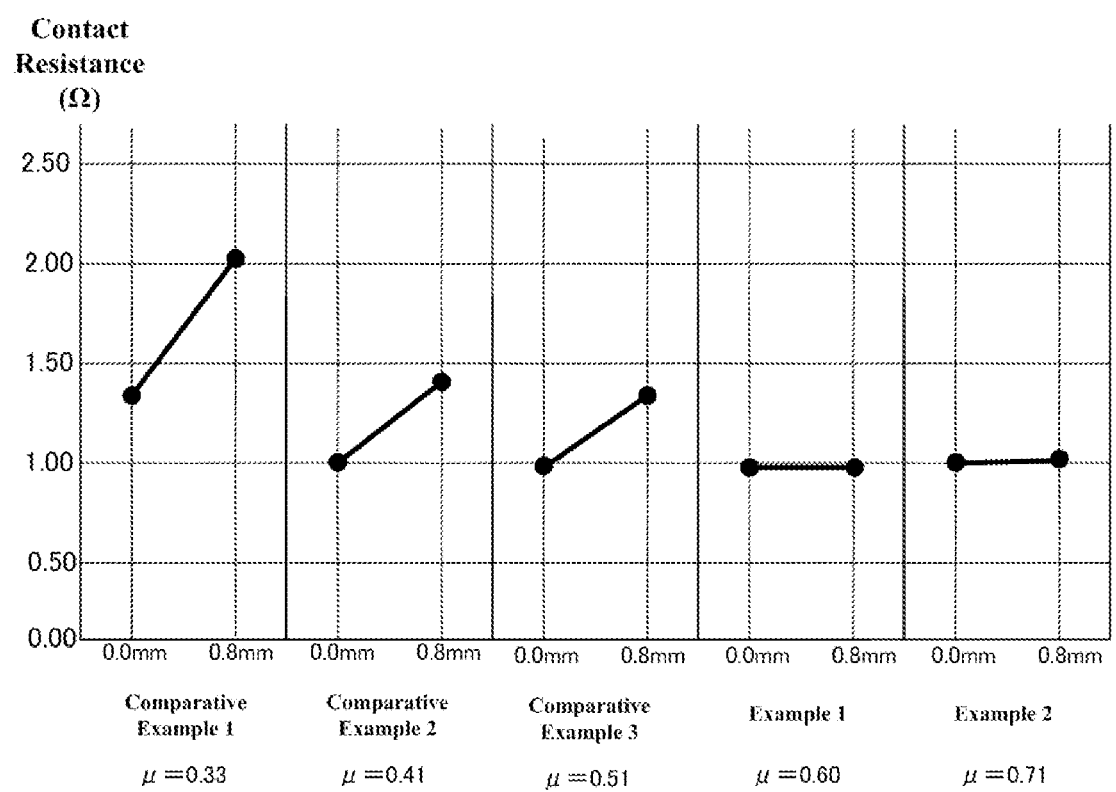
FIG. 7 is a graph indicating contact resistance for each maximum static friction coefficient when cold pressure welding is performed using a trapezoidal-shaped pressing component having side surfaces with an inclination angle of 150 degrees.

Therefore, as shown in the Table 5 and FIG. 6, when the pressing component 200 with the side surface 220 inclined at the angle of 150 degrees was used, the connection strength was improved for the comparative examples 1 to 3 in which the maximum static friction coefficient was 0.51 or less. Furthermore, the connection strength of the examples 1 and 2 with the maximum static friction coefficient of 0.6 or more was further improved in comparison with the case in which the pressing component with the side surfaces 220 inclined at the angle of 120 degrees.

As shown in the Table 5 and FIG. 6, it was observed that, when the pressing component 200 with the side surface 220 inclined at the angle of 150 degrees was used, the difference in the contact resistance between the cases in which the cathode body 3 was lifted up by 0.0 mm and 0.8 mm becomes smaller as the maximum static friction coefficient gets larger. Furthermore, when the maximum static friction coefficient was 0.6 or more while using the pressing component 200 with the side surface 220 inclined at the angle of 150 degrees, the difference in the contact resistance between the cases in which the cathode body 3 was lifted up by 0.0 mm and 0.8 mm becomes almost zero.

REFERENCE SIGN

1: electrolytic capacitor
2: anode body
3: cathode body
31: cathode foil
32: carbon layer
33: cold pressure welded region
33*a*: flat surface
33*b*: inclined surface
4: separator
5: dielectric oxide film
6: electrolytic solution
7: lead terminal
71: flat portion
200: pressing component
210: flat surface
220: side surface

The invention claimed is:

1. An electrolytic capacitor comprising:
    an anode body having a dielectric layer on a surface thereof;
    a cathode body having a cathode foil and a carbon layer formed by pressing on the cathode foil;
    an electrolyte interposed between the anode body and the cathode body; and
    a lead terminal connected to the anode body and the cathode body by cold pressure welding,
    wherein a maximum static friction coefficient of a surface of the carbon layer of the cathode body is 0.6 or more.

2. The electrolytic capacitor according to claim 1, wherein the carbon layer includes graphite at ratio of 18 wt % or less relative to the total amount of all carbon material in the carbon layer, including none.

3. The electrolytic capacitor according to claim 2, wherein the carbon layer includes spherical carbon as the carbon material.

4. The electrolytic capacitor according to claim 1, wherein the carbon layer includes spherical carbon as the carbon material.

5. The electrolytic capacitor according to claim 4, further comprising:
 a cold pressure welded region at a boundary surface between the cathode body and the lead terminal,
 wherein the cold pressure welded region has a flat surface and an inclined surface with an inclination angle of 120 degrees or more relative to the flat surface.

6. The electrolytic capacitor according to claim 1, further comprising:
 a cold pressure welded region at a boundary surface between the cathode body and the lead terminal,
 wherein the cold pressure welded region has a flat surface and an inclined surface with an inclination angle of 120 degrees or more relative to the flat surface.

7. A production method of an electrolytic capacitor in which an anode body having a dielectric layer on a surface thereof and a cathode body face each other via an electrolyte, the method comprising:
 a cathode body production process of forming a carbon layer on a cathode foil and pressing the carbon body having the cathode foil and the carbon layer, and
 a cold pressure welding process of connecting the cathode body having the carbon layer formed thereon to a lead terminal by cold pressure welding, wherein a maximum static friction coefficient of a surface of the carbon layer being 0.6 or more.

8. The production method of the electrolytic capacitor according to claim 7, wherein:
 in the cold pressure welding process, the cathode body and the lead terminal are laminated and pressed by a pressing component, and
 the pressing component has a flat surface and a side surface with an inclination angle of 120 degrees or more relative to the flat surface.

9. The production method of the electrolytic capacitor according to claim 8, wherein, in the cold pressure welding process, the carbon layer includes graphite at ratio of 18 wt % or less relative to the total amount of all carbon material in the carbon layer, including none.

10. The production method of the electrolytic capacitor according to claim 8, wherein, in the cold pressure welding process, the carbon layer includes spherical carbon as the carbon material.

11. The production method of the electrolytic capacitor according to claim 7, wherein, in the cold pressure welding process, the carbon layer includes graphite at ratio of 18 wt % or less relative to the total amount of all carbon material in the carbon layer, including none.

12. The production method of the electrolytic capacitor according to claim 7, wherein, in the cold pressure welding process, the carbon layer includes spherical carbon as the carbon material.

* * * * *